United States Patent Office 3,436,402
Patented Apr. 1, 1969

3,436,402
1,1 DIARYL-2-PROPYNYL CARBAMATES
Donald R. Cassady, Robert D. Dillard, and Nelson R. Easton, Indianapolis, Ind., assignors to Eli Lilly and Company, Indianapolis, Ind., a corporation of Indiana
No Drawing. Continuation-in-part of application Ser. No. 421,677, Dec. 28, 1964. This application Mar. 11, 1966, Ser. No. 533,405
Int. Cl. C07d 27/00; A61k 27/00
U.S. Cl. 260—326.3    12 Claims

ABSTRACT OF THE DISCLOSURE 1,1 diaryl-2-propynyl carbamates and 1,1 diaryl-allyl carbamates useful as anti-cancer agents, anti-fungi, prevent the growth of bacteria and have antiviral activity. The propynyl carbamates are prepared by reacting a diarylethynyl carbinol with an isocyanate and other conventional procedures. The carbamates thus prepared may be hydrogenated to the corresponding allyl carbamates.

---

This is a continuation-in-part of application Ser. No. 421,677, filed Dec. 28, 1964, now abandoned.

This invention relates to certain novel carbamates and to a therapeutic process employing these carbamates.

The compounds provided by this invention can be represented by the following formula:

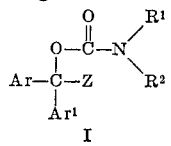

wherein Ar and $Ar^1$, when taken separately, are phenyl, α-naphthyl, β-naphthyl, 2-pyridyl, 3-pyridyl, 4-pyridyl, α-thienyl, β-thienyl, α-furyl, or β-furyl; Ar and $Ar^1$, when taken together with the carbon atom to which they are attached, are 9-fluorenyl, 9,10-dihydroanthracen-9-yl, 10,11 - dihydro-5H-dibenzo[a,d]cyclohepten - 5 - yl, or 5H-dibenzo[a,d]cyclohepten-5-yl; $R^1$ and $R^2$, when taken separately, are hydrogen, $C_1$–$C_6$ alkyl, $C_1$–$C_6$ hydroxyalkyl, $C_3$–$C_6$ alkenyl, $C_3$–$C_6$ alkynyl, $C_3$–$C_8$ cycloalkyl, or $C_5$–$C_8$ bicycloalkyl; $R^1$ and $R^2$, when taken together with the nitrogen atom to which they are attached, are aziridino, azetidino, pyrrolidino, piperidino, piperazino, morpholino, or thiomorpholino; and Z is an acetylenic or ethylenic radical having the structure

or

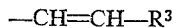

wherein $R^3$ is hydrogen, halo, phenyl, α-naphthyl, β-naphthyl, 2-pyridyl, 3-pyridyl, 4-pyridyl, α-thienyl, β-thienyl, α-furyl, β-furyl, lower-alkoxy-lower alkyl, lower-alkylmercapto, lower-alkylmercapto-lower alkyl, lower-alkylamino-lower alkyl, or di-lower-alkylamino-lower alkyl.

"Lower alkyl," as used herein, is to be understood to mean $C_1$–$C_3$ alkyl—viz., methyl, ethyl, n-propyl, and isopropyl.

"$C_1$–$C_6$ alkyl" includes methyl, ethyl, n-propyl, isopropyl, n-butyl, sec.-butyl, tert.-butyl, isobutyl, n-amyl, isoamyl, neopentyl, n-hexyl, isohexyl, and the like.

"$C_2$–$C_6$ alkenyl" refers to the $C_2$–$C_6$ alkyl groups, as defined, from which a hydrogen atom has been removed from each of two adjacent carbon atoms to produce ethylenic unsaturation; e.g., vinyl, allyl, methyl, 1-pentenyl, 2-hexenyl, and the like.

"$C_2$–$C_6$ alkynyl" refers to the $C_2$–$C_6$ alkyl groups, as defined, from which two hydrogen atoms have been removed from each of two adjacent carbon atoms to produce acetylenic unsaturation; e.g., ethylnyl, propargyl, 2-butynyl, 1-pentynyl, 3-hexynyl, and the like.

"$C_3$–$C_8$ cycloalkyl" includes cyclopropyl, cyclobutyl, cyclopentyl, cyclohexyl, cycloheptyl, and cyclooctyl.

"$C_5$–$C_8$ bicycloalkyl" refers to bicyclo[2.1.0]pentyl, bicylo[2.2.0]hexyl, bicyclo[1.2.1]hexyl, norbornyl, bicyclo[2.2.2]octyl, and the like.

"Halo" refers to fluoro, chloro, bromo, and iodo.

"Lower-alkoxy" refers to $C_1$–$C_3$ alkoxy, and includes methoxy, ethoxy, n-propoxy, and isopropoxy.

"Lower-alkylmercapto" refers to $C_1$–$C_3$ alkylmercapto, and includes methylmercapto, ethylmercapto, n-propylmercapto, and isopropylmercapto.

"Lower-alkylamino" refers to $C_1$–$C_3$ alkylamino, and includes methylamino, ethylamino, n-propylamino, and isopropylamino.

"Di-lower alkylamino" refers to di($C_1$–$C_3$ alkyl)amino, and includes dimethylamino, diethylamino, di-n-propylamino and diisopropylamino, as well as the mixed-alkyl dialkylamines—e.g., methylethylamine, methylisopropylamine, ethyl-n-propylamine, and the like.

Representative compounds provided by this invention include the following:

1,1-diphenylpropargyl N-ethylcarbamate
1,1-diphenyl-2-propynyl N,N-dimethylcarbamate
1-phenyl-1-(p-tolyl)-2-propyl carbamate
1-phenyl-1-(4-bromophenyl)-2-propynyl carbamate
1,1-diphenyl-2-propynyl carbamate
1-(4-bromophenyl)-1-phenyl-2-propynyl N-methylcarbamate
1-(3-chlorophenyl)-1-phenyl-2-propynyl carbamate
1-(3-chlorophenyl)-1-phenyl-2-propynyl N,N-dimethylcarbamate
1-(3-chlorophenyl)-1-phenyl-2-propynyl N-methylcarbamate
1,1-diphenyl-2-propynyl N-(2-propynyl)carbamate
1,1-diphenyl-2-propynyl N-cyclopropylcarbamate
1-(2-chlorophenyl)-1-phenyl-2-propynyl carbamate
1-phenyl-1-(2-thienyl)-2-propynyl N-methylcarbamate
1-(4-fluorophenyl)-1-phenyl-2-propynyl N,N-dimethylcarbamate
1-(4-fluorophenyl)-1-phenyl-2-propynyl carbamate
1-(2-naphthyl)-1-phenyl-2-propynyl 1-pyrrolidinecarboxylate
1-phenyl-1-(p-chlorophenyl)-2-propynyl carbamate
1,1-diphenyl-2-propynyl N-(3-dimethylaminopropyl) carbamate
1-phenyl-1-(4-biphenylyl)-2-propynyl carbamate
1-(3-bromophenyl)-1-phenyl-2-propynyl carbamate
1-(3-bromophenyl)-1-phenyl-2-propynyl N,N-dimethylcarbamate
1,1-diphenylpropargyl N-methylcarbamate
9-ethylnyl-9-fluorenyl N-methylcarbamate
1,1-diphenylallyl N-methylcarbamate
5-vinyl-5-(10,11-dihydro-5H-dibenzo[a,d]cycloheptenyl) carbamate
1-phenyl-1-(3-nitrophenyl)-3-methylthio-2-propynyl N-butylcarbamate
1-(3-chlorophenyl)-1-phenylallyl carbamate
1-phenyl-1-(4-trifluoromethylphenyl)-3-dimethylaminomethylallyl 1-azetidinecarboxylate
1-(4-bromophenyl)-1-phenyl-2-propynyl 1-pyrrolidinecarboxylate
1,1-diphenyl-2-propynyl 4-(2-hydroxyethyl) 1-piperazinecarboxylate
1,1-diphenyl-2-propynyl 4-methyl 1-piperazinecarboxylate
1-phenyl-1-(2-naphthyl)-2-propynyl N,N-dimethylcarbamate
1-(4-chlorophenyl)-1-phenyl-2-propynyl 1-pyrrolidinecarboxylate 1,1-diphenyl-2-propynyl 1-piperidinecarboxylate
9-ethynyl-9-fluorenyl N,N-dimethylcarbamate
1-phenyl-1-(2-pyridyl)-2-propynyl N,N-dimethylcarbamate
1-(4-chlorophenyl)-1-phenyl-2-propynyl N-methylcarbamate
1,1-diphenyl-2-propynyl 4-morpholinecarboxylate
1,1-diphenyl-2-propynyl N-cyclohexylcarbamate
1-(4-fluorophenyl)-1-phenyl-5-diethylamino 2-pentynyl-N-cyclopropylcarbamate
1,1-bis(4-fluorophenyl)-2-propynyl N-norbornylcarbamate
1,1-diphenyl-2-propynyl N-bicyclo[2,2,2]octylcarbamate Compounds represented by the above formula are prepared by methods well-known to those skilled in the art, such as the methods of Ensslin and Meier, U.S. Patent No. 2,798,885; Marshall et al., U.S. Patent No. 2,814,637; and Mehla and Catlin, U.S. Patent No. 3,062,870; and as described in this specification. The semi-reduced ethylenic derivatives are prepared from the acetylene compounds by catalytic hydrogenation in the presence of a heavy metal as for example 5% palladium on barium sulfate or 5% palladium on calcium carbonate in the presence of a solid base such as powdered potassium hydroxide.

Compounds represented by the above formula have many pharmacological and biological properties in common. One unexpected property is a complete lack of the hypnotic or sedative activity which is commonly observed in the species wherein Ar and/or $Ar^1$ in the above formula is replaced with hydrogen or aliphatic and substituted aliphatic hydrocarbon radicals, as taught in Ensslin and Meier, U.S. Patent No. 2,798,885; and Marshall et al., U.S. Patent No. 2,814,637. The absence of this hypnotic activity allows the compounds to be used for their other biological and pharmaceutical properties. One of these beneficial properties is the ability to prevent the growth of certain bacteria and fungi when added to a culture medium inoculated with said organisms. The several examples of organisms so inhibited include *Staphylococcus aureus, Bacillus subtilis, Mycobacterium avium, Vibrio metschnikovii, Trichophyton mentagrophytes, Schlerotinia fructicola,* and certain algae such as *Tetrahymena pyriformis* and *Ochromonas malhamensis*. A second beneficial property of the compounds of this invention is their antiviral activity. The activity manifests itself especially against influenza virus in infected live mice.

In addition to the above stated activity, certain of the compounds have the ability to inhibit the growth of various malignancies. Tests of the effectiveness of these compounds against certain transplanted malignancies in mice, has demonstrated their high level of efficacy including complete regression of the disease and apparent cure in a high percentage of animals. The compounds of this invention, then, have utility in the study of the mechanism by which cancer and related malignancies attack a host species.

The compounds which have been found to be active against malignancies can be represented by the formula

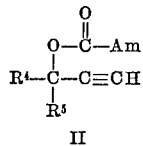

II wherein $R^4$ and $R^5$, when taken separately, are phenyl, tolyl, monohalophenyl, naphthyl, xenyl, trifluoromethylphenyl, or pyridyl, and, when taken together with the carbon atom to which they are attached, fluorenyl, wherein the acetylenic function is attached directly to the 9-position of the fluorenyl radical; Am is $-NR^6R^7$,

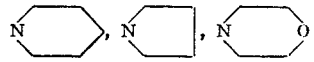

or

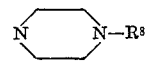

wherein $R^6$, $R^7$, and $R^8$ are hydrogen, $C_1$–$C_6$ alkyl, $C_1$–$C_6$ hydroxyalkyl, di-lower-alkylamino-lower alkyl, $C_3$–$C_6$ alkenyl, $C_3$–$C_6$ alkynyl, $C_3$–$C_8$ cycloalkyl, or $C_5$–$C_8$ bicycloalkyl.

When $R^4$ and $R^5$ are monohalophenyl, they may contain any one of the halogens with atomic numbers 9 to 53 inclusive, illustratively p-fluorophenyl, m-chlorophenyl, o-iodophenyl, p-bromophenyl. The term "$C_1$–$C_6$ hydroxyalkyl" includes all of the $C_1$ to $C_6$ alkyl groups when substituted with hydroxy at any available position of the alkyl chain, including such groups as 2-hydroxyethyl, 2-hydroxypropyl, 3-hydroxy-2-pentyl, 2-hydroxy-1,1-dimethylethyl, 5-hydroxyhexyl, and the like.

Compounds represented by Formula II above demonstrated their activity by inhibiting the growth of transplanted malignancies. All tests represent a comparison of malignant growth in the test animals versus that in control animals.

Control animals have been implanted with the tumor and are treated identically to the test animals except that they are dosed daily with a volume of solution identical to that given the test animals without the inclusion of the test drug.

Primary testing systems include the following malignancies:

X–5563 plasma cell myeloma, solid tumor. — Maintained in $C_3H$ mice. This tumor is characterized as a nonmetastasizing, slow-growing solid tumor. The tumor is transferred by trocar implantation using small tumor fragments. Seventy-two hours after implantation, treatment is begun. Animals are treated for a total of 9 days, receiving one dose of the test material each 24 hours. Activity is determined by comparison of the tumor size (as measured through the skin using calipers) to the tumor size in control animals. For a drug to be considered active against this tumor, it must show a 35 percent reduction in tumor growth at the end of the test period. All measurements are made 24 hours after the last treatment.

C–1498 myelogenous leukemia. — Maintained in C–57B1/6 mice. The seed tumor is maintained in solid form implanted subcutaneously. However, in transferring the tumor into test animals for screening purposes, a tumor suspension is prepared and the test animals are inoculated with this suspension. Under these conditions, control animals succumb between 14 and 17 days after inoculation. Twenty-four hours after inoculation, treatment is begun and continued until all animals have received a total of 10 doses of the test material. Activity is determined by comparison of the average life of the treated animals over control animals. To be considered active a compound must increase the life-span greater than 20 percent over the control animals.

AC–755 adenocarcinoma (breast tumor).—Maintained in C–57B1/6 mice. This tumor is in solid form and is implanted subcutaneously by means of a trocar into the axillary region. Treatment is begun 24 hours after implantation, and animals are treated for a total of 10 injections of the test material. Activity is determined by comparison of the tumor size in test animals to the tumor size in control animals. Tumor size is obtained by two-dimensional measurement through the skin using calipers. Active compounds must inhibit the growth of the tumor 35 percent over that of the control animals.

MLS mecca lymphosarcoma, solid tumor.—Maintained in AKR mice. This is a non-metastasizing solid tumor. Activity is determined in the same manner as AC–755. For a drug to be considered active it must inhibit tumor growth 40 percent over that of the control animals. Activity can also be determined by a measurement of the prolongation of life of the treated animals over that of the control animals.

Table 1 demonstrates the activity of several members of the preferred group of compounds against these malignancies. The figures in the table represent the following data:

Column 1 lists the chemical name of the test compound. Columns 2 and 3, the activity of the drug on the X-5563 system, in a three-part series, the first number representing the reduction in tumor size over the control animals as demonstrated by the test drug at a nearly optimal dose. (A dose/response correlation is included as Table 3 for representative species.) The second number (in parentheses) represents the total number of animals alive out of 10 animals at the end of the test period. The number after the slash mark (/) represents the dose at which the drug was administered either into the peritoneal cavity (I.P.) or orally (ORAL).

Columns 4 and 5 are in two parts, the first representing the prolongation in life over the control animals; that part after the slash mark represents the drug dose at which the activity was demonstrated. Numbers in parentheses are the number of animals still alive 45 days after inoculation and are not included in the calculation of the activity. The animals so represented are apparently cured of their malignancy.

Columns 6 and 7 are identical to column 2 in their presentation of data.

A dash (—) indicates that the activity of the test compound against the malignancy has not as yet been fully determined.

Table 3 demonstrates the dose-response relationships for several representative compounds in the preferred group of carbamates. Column 1 lists the chemical name of the test compound. Column 2 lists the dose of drug administered to each animal daily for 10 days. Column 3 lists the activity of the drug, against the X-5563 system, as the percent reduction in tumor size when compared to the control animals. Column 4 lists the number of animals alive at the end of the test period.

TABLE 3.—DOSE-RESPONSE RELATIONSHIPS FOR REPRESENTATIVE CARBAMATES

| Compound | Dose, mg./kg. | Reduction in tumor size, percent | Survivors at end of test period |
|---|---|---|---|
| 1-(p-chlorophenyl)-1-phenyl-2-propynyl carbamate. | 15 | 57 | 10 |
| | 20 | 66 | 9 |
| | 25 | 88 | 10 |
| | 40 | 100 | 9 |
| | 55 | 100 | 3 |
| | 60 | 90 | 5 |
| | 70 | 100 | 1 |
| 1-(p-bromophenyl)-1-phenyl-2-propynyl carbamate. | 60 | 80 | 10 |
| | 70 | 100 | 8 |
| | 70 | 100 | 9 |
| | 90 | 100 | 1 |
| 1,1-diphenyl-2-propynyl N-methylcarbamate. | 3 | 0 | 10 |
| | 6 | 0 | 10 |
| | 9 | 0 | 10 |
| | 12 | 56 | 10 |
| | 15 | 64 | 10 |
| | 22 | 100 | 10 |
| | 24 | 88 | 8 |
| | 26 | 91 | 8 |
| | 30 | 97 | 8 |

TABLE 1

| Name | X-5563 I.P. | X-5563 Oral | C-1498 I.P. | C-1498 Oral | AC-755 I.P. | MLS I.P. |
|---|---|---|---|---|---|---|
| 1,1-diphenyl-2-propargyl N-methylcarbamate | 100(10)/22 | | 53/30 | 29/30 | 33(10)/30 | 0 |
| 1,1-diphenyl-2-propargyl N-ethylcarbamate | 97(8)/30 | 59(9)/60 | 115/30(2) | 29/60 | 40(10)/30 | 100(5)/30 |
| 1,1-diphenyl-2-propynyl N,N-dimethylcarbamate | 65(10)/15 | 66(6)/15 | 76/15 | | | 63(6)/15 |
| 1-(4-bromophenyl)-1-phenyl-2-propynyl carbamate | 72(10)/60 | 76(10)/60 | 120/60(1) | 30/60 | 0 | 0 |
| 1-(4-bromophenyl)-1-phenyl-2-propynyl N-methylcarbamate | 100(8)/45 | | 82/60(2) | | 60(6)/60 | 33(10)/60 |
| 1,1-diphenyl-2-propynyl N-(2-propynyl)-carbamate | 98(8)/15 | | 44/7.5 | | 34(5)/15 | 0 |
| 1-(4-chlorophenyl)-1-phenyl-2-propynyl carbamate | 88(10)/25 | 100(8)/75 | 106/42 | 85/45 | 49(10)/45 | |
| 1-(4-chlorophenyl)-1-phenyl-2-propynyl N-methylcarbamate | 90(10)/15 | | 92/15 | | 0 | 30(10)/15 |
| 1,1-diphenyl-2-propynyl 1-pyrrolidinecarboxylate | 90(10)/7.5 | | 36/7.5 | | 36(4)/15 | 0 |
| 1,1-diphenyl-2-propynyl N-cyclohexyl carbamate | 96(7)/7.5 | | 34/7.5 | | 0 | 58(4)/15 |
| 1-(2-chlorophenyl)-1-phenyl-2-propynyl N,N-dimethylcarbamate | 25(10)/60 | | 20/45 | | 30(9)/60 | 40(9)/60 |
| 1-phenyl-1-(2-naphthyl)-2-propynyl carbamate | 68(9)/7.5 | | 62/7.5 | | 43(2)/15 | 0 |
| 1,1-bis(4-chlorophenyl)-2-propynyl N-methylcarbamate | 59(8)/15 | | 51/15 | | 49(5)/30 | 0 |
| 1,1-bis(4-chlorophenyl)-2-propynyl carbamate | 93(6)/60 | | 60/60 | 28/90 | 40(3)/60 | 0 |
| 1-(4-chlorophenyl)-1-phenyl-2-propynyl N,N-dimethylcarbamate | 75(7)/7.5 | 100(10)/30 | 46/7.5 | 56/45 | 59(9)/45 | 49(6)/30 |
| 1-(4-fluorophenyl)-1-phenyl-1-propynyl N,N-dimethylcarbamate | 52(8)/5 | | 57/7.5 | | 0 | 0 |

Table 2 represents the breadth of activity of the preferred group of compounds against a wide range of tumor systems maintained in the Lilly Research Laboratories, Eli Lilly and Company, Indianapolis, Ind. The tumor systems represented are named in accordance with the Journal of the National Cancer Institute, vol. 13 No. 5, pages 1299 to 1377 (1953), or are available through the Sloan Kettering Institute of Cancer Research, Graduate School, Cornell University Medical College, N.Y.C.; Yale University School of Medicine, New Haven, Conn.; or Lilly Research Laboratories, Eli Lilly and Company, Indianapolis, Ind. Results are reported in a similar manner to those in Table 1.

| Compound | Dose, mg./kg. | Reduction in tumor size, percent | Survivors at end of test period |
|---|---|---|---|
| 1-(p-chlorophenyl)-1-phenyl-2-propynyl N,N-dimethylcarbamate. | 5 | 0 | 9 |
| | 7.5 | 75 | 7 |
| | 10 | 75 | 9 |
| | 12.5 | 85 | 10 |
| | 15 | 80 | 10 |
| | 20 | 100 | 10 |
| | 25 | 100 | 9 |
| | 30 | 100 | 8 |
| | 45 | 100 | 3 |

TABLE 2

| | 1,1-diphenyl-2-propynyl N-methylcarbamate | 1-(p-bromophenyl)-1-phenyl-2-propynyl carbamate | 1-(p-chlorophenyl)-1-phenyl-2-propynyl carbamate | 1,1-bis(p-chlorophenyl)-2-propynyl N,N-dimethylcarbamate | 1-phenyl-1-(2-naphthyl)-2-propynyl carbamate |
|---|---|---|---|---|---|
| Dose, mg./kg. I.P. in mice | 12 | 69 | 45 | 30 | 5 |
| L5178Y Leukemia (Yale Univ.), percent | 0 | [1] 20 | 0 | 0 | |
| B-82 Myeloid Leukemia (Sloan Kettering), percent | 0 | 57 | 45 | 40 | 22 |
| AKR Leukemia, percent | 22 | 34 | 34 | 63 | 39 |
| S-91 Myeloma, percent | 0 | 0 | 39 | 0 | 0 |
| S-180 Sarcoma, percent | 0 | 80 | 0 | 0 | 0 |
| Ridgeway Osteogenic, percent | 0 | 61 | 50 | 100 | 0 |
| Rhabdomyosarcoma (Lilly), percent | 0 | 0 | 0 | 35 | 0 |
| C₃H mammary carcinoma, percent | 39 | 34 | [1] 62 | 0 | 0 |
| Ehrlich Ascites, percent | 152 [2]+2 | 140 [2]+1 | 0 [2]+4 | 0 | 80 |
| Freund Ascites (U.S.P.H.S. of N.Y.C.), percent | 143 [2]+2 | 145 [2]+5 | 50 [2]+2 | 0 | 0 |
| S-180 Ascites, percent | 105 [2]+4 | 66 [2]+1 | 0 [2]+4 | 0 | 56 |
| X-5563 Myeloma, percent | 56 | 80 | 100 | 100 | 91 |
| C-1498 Myelogenous Leukemia, percent | 100 | 60 | 46 [2]+2 | 62 | 62 |
| MLS Mecca Lymphosarcoma, percent | [3] 68 | 0 | 85 | 49 | 0 |
| AC-755 Adenocarcinoma, percent | [3] 32 | 0 | 0 | 29 | [3] 43 |
| P-1534 Leukemia, percent | 0 | 0 | 0 | 0 | 0 |

[1] At 30 mg./kg.  [2] Animals surviving 45 days after implantation.  [3] At 15 mg./kg.

The following examples illustrate the procedures available for the preparation of the compounds of this invention.

Example 1.—1,1-diphenylpropargyl N-methylcarbamate

A reaction mixture was prepared containing 25 g. diphenyl ethynyl carbinol, 20 g. methyl isocyanate, and 2.0 g. triethylenediamine. The mixture was warmed for 4 hours on a steam bath. After this period, 200 ml. of dilute (0.1 N) hydrochloric acid and 200 ml. of diethyl ether were added. The ether solution was separated, dried over anhydrous magnesium sulfate, and the volatile solvents removed in vacuo. After recrystallization from ethanol, 1,1-diphenyl - 2 - propargyl N-methylcarbamate thus prepared melted at about 153–154° C.

Analysis.—Calcd. $C_{17}H_{15}NO_2$: C, 76.96; H, 5.69. Found: C, 76.98; H, 5.81.

Compounds prepared by this method in addition to 1,1-diphenyl-2-propargyl N-methylcarbamate include:

9-ethynyl-9-fluorenyl N-methylcarbamate; melting point: 153–154° C.

1,1-diphenylpropargyl N-ethylcarbamate; melting point: 108–109° C.

Example 2.—1-(4-bromophenyl)-1-phenyl-2-propynyl N-methylcarbamate 34.6 grams of 1-(4-bromophenyl)-1-phenyl-2-propyl-1-ol were treated with 20 grams of methyl isocyanate as in Example 1. However, 200 ml. of chloroform were used as a solvent and the reaction mixture was allowed to cool and to stand at room temperature for 5 days. Evaporation of the solvents and recrystallization of the resulting residue yielded 1-(4-bromophenyl)-1-phenyl-2-propynyl N-methylcarbamate, melting at about 149–151° C.

Analysis.—Calcd. $C_{17}H_{14}NO_2Br$: C, 59.32; H, 4.09; N, 4.07. Found: C, 59.38; H, 3.91; N, 3.93.

Compounds prepared by this method in addition to 1-(4-bromophenyl)-1-phenyl - 2 - propynyl N-methylcarbamate include:

1-(3-chlorophenyl)-1-phenyl-2-propynyl N-methylcarbamate; melting point: 92–94° C.

1-(4-chlorophenyl)-1-phenyl-2-propynyl N-methylcarbamate; melting point: 139–140° C.

1,1-bis(4-chlorophenyl)-2-propynyl N-methylcarbamate; melting point: 173.5–174.0° C.

1-phenyl-1-(2-thienyl)-2-propynyl N-methylcarbamate; melting point: 114–115° C.

Example 3.—1-phenyl-1-(p-chlorophenyl)-2-propynyl carbamate

A mixture of 24.2 g. of 1-(4-chlorophenyl)-1-phenyl-2-propyn-1-ol and 40 g. of pyridine was treated at 0° C. by the dropwise addition of 15.6 g. of phenyl chloroformate. After addition of the phenyl chloroformate was complete, the mixture was stirred 4 additional hours at about 5° C.; then 150 ml. of ice water and 100 ml. of ether were added. The ether layer was washed successively with 100 ml. of ice-cold 5 N hydrochloric acid solution, 100 ml. of a cold saturated solution of sodium bicarbonate, and 50 ml. of ice water. The washed ether solution, after being dried over anhydrous magnesium sulfate, was added at a fairly rapid rate to 200 ml. of liquid anhydrous ammonia with stirring, and the resulting reaction mixture was stirred and warmed to ambient temperature to remove the excess ammonia. Extraction of the ethereal residue with 100 ml. of water and define (5 N) base removed the phenol formed as a by-product of the reaction. Evaporation of the ether in vacuo left the nearly pure product, which was purified further by recrystallization from benzene. 1-phenyl-1-(p-chlorophenyl)-2-propynyl carbamate thus prepared melted at about 140–142° C.

Analysis.—Calcd. $C_{16}H_{12}NO_2Cl$: C, 67.25; H, 4.23. Found: C, 67.27; H, 4.41.

Compounds prepared by this method in addition to 1-phenyl-1-(p-chlorophenyl)-2 - propynyl carbamate include:

1-phenyl-1-(p-tolyl)-2 - propylnyl carbamate; melting point: 128–130° C.

1,1-diphenyl-2-propynyl carbamate; melting point: 121–123° C.

1-phenyl-1-(2-naphthyl)-2-propynyl carbamate; melting point: 155–156° C.

Example 4.—1-(4-bromophenyl)-1-phenyl-2-propynyl carbamate

A mixture of 57.4 g. of 1-(4-bromophenyl)-1-phenyl-2-propyn-1-ol, 80 ml. of pyridine, and 200 ml. of dichloromethane was cooled to 0° C. and treated with 31.3 g. of phenyl chloroformate dropwise with stirring over a one-hour period. The reaction mixture was stirred 4 additional hours and 200 ml. of water were added cautiously. Extraction of the crude product with 500 ml. of diethyl ether, separation of the ether layer, and washing the ether layer with 100 ml. of 5 N HCl followed by 100 ml. saturated sodium bicarbonate solution yielded an ethereal solution of phenyl 1-(4-bromophenyl)-2-propynyl carbonate. This solution was added rapidly with stirring to 400 ml. of anhydrous liquid ammonia. The liquid ammonia was allowed to evaporate over a 4-hour period and was replaced with an equal volume of ether. The ethereal residue was washed with cold, dilute (5 N) sodium hydroxide, dried, and the solvents removed in vacuo. The residual 1-(4-bromophenyl)-1-phenyl-2-propynyl carbamate was recrystallized from benzene and melted at about 137–139° C.

Analysis.—Calcd. $C_{16}H_{12}NO_2Br$: C, 58.20; H, 3.66. Found: C, 58.39; H, 3.92.

Compounds prepared by this method in addition to 1-(4-bromophenyl)-1-phenyl-2-propynyl carbamate include:

1-(4-fluorophenyl)-1-phenyl-2-propynyl carbamate; melting point: 99–101° C.

1-(3-chlorophenyl)-1-phenyl-2-propynyl carbamate; melting point: 113–115° C.

1-(2,4-dichlorophenyl)-1-phenyl-2 - propynyl carbamate; melting point: 163–165° C.

1-phenyl-1-(p-biphenylyl)-2-propynyl carbamate; melting point: 152–154° C.

1-(3-bromophenyl)-1-phenyl-2-propynyl carbamate; melting point: 121–129° C.

1-(3,4-dichlorophenyl)-1-phenyl - 2-propynyl carbamate; melting point: 150–160° C.

1-(2-chlorophenyl)-1-phenyl-2-propynyl carbamate; melting point: 169–171° C.

1-(4-chlorophenyl)-1-(3,4-dichlorophenyl) - 2-propynyl carbamate; melting point: 154–156° C.

1,1-bis(4-chlorophenyl)-2-propynyl carbamate; melting point: 131–133°C.

1-(4-chlorophenyl)-1-(2,4-dichlorophenyl) - 2 - propynyl carbamate; melting point: 145–147° C.

Example 5.—1-(3-bromophenyl)-1-phenyl-2-propynyl N,N-dimethylcarbamate

To a mixture of 57.4 g. of 1-(3-bromophenyl)-1-phenyl-2-propyn-1-ol, 80 ml. of pyridine, and 200 ml. of dichloromethane being held at 0° C. by external cooling, were added 31.3 g. phenyl chloroformate over a one-hour period. After 4 additional hours' reaction time, during which the mixture was allowed to warm to ambient room temperature, 200 ml. of ice water were added, the reaction mixture was extracted with 500 ml. diethyl ether, and the organic layer washed with saturated sodium bicarbonate solution and ice water. The ethereal solution was dried over anhydrous magnesium sulfate and added to a solution of 70 ml. of anhydrous dimethylamine in 200 ml. of diethylether. The reaction mixture was stirred overnight, washed with 500 ml. of ice water, 100 ml. of dilute (5 N) cold sodium hydroxide, and a second portion of 500 ml. of ice water, then dried and the solvent removed in vacuo. The residue was recrystallized from a mixture of benzene and petroleum ether (boiling point 30–60° C.) and melted at about 113–115° C.

*Analysis.*—Calcd. $C_{18}H_{16}NO_2Br$: C, 60.35; H, 4.50. Found: C, 60.53; H, 4.64.

Compounds prepared by this method in addition to 1-(3-bromophenyl)-1-phenyl-2 - propynyl N,N-dimethylcarbamate include:

1-phenyl-1-(2-naphthyl)-2 - propynyl N,N-dimethylcarbamate; melting point: 111–113° C.
1-(2,4-dichlorophenyl)-1-phenyl-2 - propynyl N,N - dimethylcarbamate; melting point: 157–159° C.
1,1-diphenyl-2-propynyl N,N-dimethylcarbamate; melting point: 100–102° C.
1-(3-chlorophenyl)-1-phenyl-2 - propynyl N,N-dimethylcarbamate; melting point: 97–99° C.
1,1-diphenyl-2-propynyl N-(2-propynyl)carbamate; melting point: 125–127° C.
1-(4-fluorophenyl)-1-phenyl-2-propynyl N,N-dimethylcarbamate; melting point: 124–126° C.
1-(3,4-dichlorophenyl)-1-phenyl-2-propynyl N,N-dimethylcarbamate; melting point: 155–157° C.
1-(3,4-dichlorophenyl)-1-phenyl-2-propynyl 1-pyrrolidinecarboxylate; melting point: 121–123° C.
1-(4-chlorophenyl)-1-phenyl-2-propynyl 1-pyrrolidinecarboxylate; melting point: 77–79° C.
1,1-diphenyl-2-propynyl 1-piperidinecarboxylate; melting point: 158–160° C.
1,1-diphenyl-2-propynyl 1-pyrrolidinecarboxylate; melting point: 157–158° C.
1,1-diphenyl-2-propynyl 4-morpholinecarboxylate; melting point: 143–144° C.
1,1-diphenyl-2-propynyl N-cyclohexylcarbamate; melting point: 155–157° C.
1-(4-bromophenyl)-1-phenyl-2-propynyl N,N - dimethylcarbamate; melting point: 144–146° C.
1,1 - diphenyl-2-propynyl N-(2-hydroxyethyl)carbamate; melting point: 100–102° C.
1-(2-chlorophenyl)-1-phenyl-2-propynyl N,N-dimethylcarbamate; melting point: 150–152° C.
1,1-diphenyl-2-propynyl N-allylcarbamate; melting point: 96–98° C.
1-phenyl-1-(4-chlorophenyl)-2-propynyl N,N - dimethylcarbamate; melting point: 135–137° C.
1,1-bis(4-chlorophenyl)-2-propynyl N,N-dimethylcarbamate; melting point: 162–164° C.
1,1-diphenyl-2-propynyl N-cycloheptylcarbamate; melting point: 148–150° C.
1,1-diphenyl-2-propynyl N-cyclooctylcarbamate; melting point: 162–165° C.
1,1-bis(4-fluorophenyl)-2-propynyl N - cyclohexylcarbamate; melting point: 177–179° C.
1-(4-fluorophenyl)-1-phenyl-2-propynyl N-cyclohexylcarbamate; melting point: 167–169° C.

Example 6

1-phenyl-1-(2-pyridyl)-2-propynyl N,N-dimethylcarbamate was prepared according to the procedure of Example 5, except for the elimination of both acid washes. Washing the crude reaction mixtures with acid resulted in the loss of product from the ethereal solution. Melting point, after recrystallization from benzene, 124–125° C.

*Analysis.*—Calcd. $C_{17}H_{16}N_2O_2$: C, 72.84; H, 5.75. Found: C, 72.85; H, 6.00.

Example 7

1,1 - diphenyl-2-propynyl N-(3-dimethylaminopropyl)-carbamate was prepared according to the procedure of Example 4 except that dimethylaminopropylamine was used as the base. The crude product was recrystallized from a mixture of benzene and petroleum ether (boiling point 30–60° C.); melting point: 98–100° C.

*Analysis.*—Calcd. $C_{21}H_{24}N_2O_2$: C, 74.97; H, 7.19. Found: C, 74.91; H, 7.47.

Example 8.—1,1-diphenylallyl N,N-dimethylcarbamate 1,1-diphenyl-2-propynyl N,N-dimethylcarbamate (27.9 g.) was hydrogenated in a 4:1 mixture of benzene-petroleum ether (boiling point 86–100° C.) using 0.5 g. palladium on barium sulfate and 0.5 g. powdered potassium hydroxide as a catalyst. A hydrogen pressure of 40 p.s.i.g. was applied to the solution in an autoclave for 45 minutes. After the uptake of one-tenth mole of hydrogen, the solution was removed from the autoclave, filtered, the solvent removed in vacuo, and the residue recrystallized from petroleum ether (boiling point 30–60° C.). The resulting 1,1-diphenylallyl N,N-dimethylcarbamate (7.5 g.) melted at about 102–104° C.

*Analysis.*—Calcd. $C_{18}H_{19}NO_2$: C, 76.84; H, 6.81. Found: C, 77.02; H, 6.75.

We claim:

1. A compound represented by the following formula:

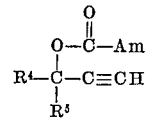

wherein $R^4$ and $R^5$, when taken separately, are members of the group consisting of phenyl, tolyl, monohalophenyl, naphthyl, xenyl, trifluoromethylphenyl, and pyridyl, and when taken together with the carbon atom to which they are attached, fluorenyl; wherein Am is a member of the group consisting of $-NR^6R^7$,

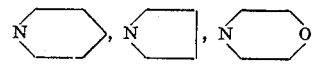

and

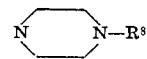

wherein $R^6$, $R^7$, and $R^8$ are members of the group consisting of hydrogen, $C_1$–$C_6$ alkyl, $C_1$–$C_6$ hydroxyalkyl, di-lower-alkylamino-lower alkyl, $C_3$–$C_6$ alkenyl, $C_3$–$C_6$ alkynyl, $C_3$–$C_8$ cycloalkyl, and $C_5$–$C_8$ bicycloalkyl.

2. A compound as in claim 1, said compound being 1-phenyl-1-(4-chlorophenyl)-2-propynyl carbamate.

3. A compound as in claim 1, said compound being 1 - phenyl-1-(4-chlorophenyl)-2-propynyl N,N-dimethyl carbamate.

4. A compound as in claim 1, said compound being 1-phenyl-1-(4-bromophenyl)-2-propynyl carbamate.

5. A compound as in claim 1, said compound being 1 - phenyl-1-(4-bromophenyl)-2-propynyl N - methylcarbamate.

6. A compound as in claim 1, said compound being 1-phenyl-1-(2-naphthyl)-2-propynyl carbamate.

7. A compound as in claim 1, said compound being 1,1-diphenyl-2-propynyl-1-pyrrolidinecarboxylate.

8. A compound as in claim 1, said compound being 1,1-diphenyl-2-propynyl N-(2-propynyl)carbamate.

9. A compound as in claim 1, said compound being 1-(4-fluorophenyl)-1-phenyl-2-propynyl N,N-dimethylcarbamate.

10. A compound as in claim 1, said compound being 1,1-diphenyl-2-propynyl N-cyclohexylcarbamate.

11. A compound as in claim 1, said compound being 1-phenyl-1-(4-biphenylyl)-2-propynyl carbamate.

12. A compound as in claim 1, said compound being 1-(4-fluorophenyl)-1-phenyl-2-propynyl-1-pyrrolidine carboxylate.

No references cited

ALEX MAZEL, *Primary Examiner.*

JOSE TOVAR, *Assistant Examiner.*

U.S. Cl. X.R.

260—239, 243, 247.1, 247.2, 268, 293.4, 294.3, 295, 295.5, 332.2, 347.4, 468, 482; 424—244, 246, 248, 250, 263, 267, 274, 275, 285, 300

UNITED STATES PATENT OFFICE
CERTIFICATE OF CORRECTION

Patent No. 3,436,402                                                                           April 1, 1969

Donald R. Cassady et al.

It is certified that error appears in the above identified patent and that said Letters Patent are hereby corrected as shown below:

Column 1, line 67, "methyl" should read -- methallyl --. Column 2, line 26, "propyl" should read -- propynyl --. Column 3, line 13, "[2,2,2]" should read -- [2.2.2] --. Columns 5 and 6, TABLE 1, first column, line 16 thereof, "-1-propynyl" should read -- -2-propynyl --; same columns, TABLE 2, third column, line 1 thereof, "69" should read -- 60 --. Column 7, line 27, "propyl" should read -- propyn --; line 66, "define" should read -- dilute --. Column 8, lines 23 and 24, "phenyl 1-(4-bromophenyl)-2-propynyl carbonate" should read -- phenyl 1-(4-bromophenyl)-1-phenyl-2-propynyl carbonate --.

Signed and sealed this 14th day of April 1970.

(SEAL)
Attest:

EDWARD M. FLETCHER, JR.                                            WILLIAM E. SCHUYLER, JR
Attesting Officer                                                            Commissioner of Patents